United States Patent [19]
Bail

[11] 3,781,888
[45] Dec. 25, 1973

[54] DIGITAL DISTANCE RANGING SYSTEM
[75] Inventor: John W. Bail, Fort Washington, Pa.
[73] Assignee: Narco Scientific Industries, Inc., Fort Washington, Pa.
[22] Filed: Oct. 30, 1972
[21] Appl. No.: 301,838

[52] U.S. Cl............... 343/13 R, 343/5 DP, 343/7.3
[51] Int. Cl.............................................. G01s 9/06
[58] Field of Search................. 343/5 DP, 7.3, 13 R

[56] References Cited
UNITED STATES PATENTS
3,151,322  9/1964  Hildebrandt..................... 343/5 DP
3,354,455  11/1967  Briggs et al........................ 343/7.3
3,320,612  5/1967  Crow et al. .................... 343/13 R X

*Primary Examiner*—Malcolm F. Hubler
*Attorney*—Henry N. Paul, Jr. et al.

[57] ABSTRACT

A digital distance ranging system, particularly adapted for use in aircraft, wherein incoming pulses are converted into signals representing discrete distance ranges. During the first search cycle (epic) of a distance search, all received pulses are distance-classified within a discrete range and remembered, and during each successive epic the received pulses are distance-compared with the remembered ranges and only repeated ranges are remembered for further comparison. When only one such remembered range remains, it is identified and displayed as the valid range.

17 Claims, 4 Drawing Figures

DIGITAL DISTANCE RANGING SYSTEM

BACKGROUND OF THE INVENTION

A. Field of the Invention

This invention lies in the field of digital distance measuring radar systems and, more particularly, digital apparatus adapted for use in a DME system which logically examines received pulses to pick out the one pulse per epic which is the true return pulse, and which determines therefrom the valid distance.

B. Description of the Prior Art

Distance-measuring equipment (DME) has long been in use in both commercial and private aircraft. In the standard DME system, the aircraft transmits a two-pulse group to the ground station, the distance to which it seeks to determine. After a predetermined delay the ground station retransmits a pulse group which is received at the aircraft. Taking into account the speed of the transmitted pulses, as well as the delay introduced at the ground station, the transit time of the pulses can be used to determine distance. The aircraft originates the transmitted pulses at a rate of about 30 pairs per second, the pulse pairs being generated randomly (non-periodically) to aid each aircraft from distinguishing its true return signals from those of other aircraft. Each pulse pair, hereinafter referred to simply as a pulse, is received by the ground station, where the pulses are detected, amplified, and then delayed for an accurately calibrated period. A modulator is thereafter triggered and a pulse from the ground station transmitted and returned.

Since many aircraft use the ground station at the same time, the aircraft receiver must be capable of selecting only those return pulses which are replies to its own transmitted pulses. In conventional DME receivers, this selection is accomplished by a search and track circuit which examines all received signals to determine which have a regular time relation with respect to the transmitted signals. When the search circuit determines which received pulses are responses to its own interrogations, the tracking unit locks on them. As is well known, the tracking apparatus is basically a servo system which develops an error signal representing the difference between the last known position and that of the most recently received pulse, and through a tracking motor and mechanical differential moves a shaft to continuously indicate the detected distance. The conventional DME receiver equipment required for "lock-on" and tracking is relatively large, bulky, and expensive. In addition, the search and track operation is relatively time-consuming, requiring a relatively large number of epics before the valid return pulses are recognized and the system locks on.

With the advent of digital technology and the availability of integrated circuits (ICs) and other relatively inexpensive and efficient digital circuit components, it becomes desirable to replace the conventional analog form of search and track circuitry with digital apparatus having the inherently greater accuracy and reliability of digital circuits. Such digital apparatus, to be used in the aircraft receiver in place of the conventional search and track circuitry, must be compatible to the existing DME system, i.e., it must be adapted to receive the pulse pairs after being returned from the ground based station, and operate on same in order to determine the distance, or range of the aircraft to such station.

The invention as disclosed and claimed herein provides a method, and apparatus for carrying out same, which replaces the prior art techniques of searching and tracking, and which performs in an entirely novel and unique functional manner. Thus, in the prior art method of searching, the receiver sweeps through the distance range until it comes to and recognizes the range it is searching for. This search procedure necessarily involves a large number of search epics, and indeed the entire distance range may have to be searched. The time of acquisition, or time for initial determination of range, depends upon how far through the range the receiver must search before it acquires the correct received pulses. In this type of system, the information which is received during each successive epic in the search operation is not utilized, but the search unit proceeds more or less blindly until it comes to the range of the aircraft, at which time it "finds" the aircraft. By contrast, in the invention disclosed herein, the system remembers from cycle to cycle the pertinent information received in the previous cycle, and by comparing pulses received and keeping only repeated pulses, the system is able to logically and quickly eliminate all extraneous pulses and determine the valid distance pulse. Thus, the apparatus of this invention does not "search" in the same sense as the conventional DME receiver does, but logically analyzes the received pulses to determine, on the basis of the information they carry, which one is the valid distance pulse for the aircraft. In actual practice, the valid distance pulse is generally obtained and identified within three epics, a greatly shorter time than is practically or even inherently realizable using the conventional analog searching approach.

The apparatus of this invention is also conceptually different from the prior art systems that it replaces in that it does not "track" as such. In the prior art system, during each cycle, or epic, an error signal is developed, and the servo motor is driven in such a manner as to reduce the error, thus permitting the analog system to follow, or track the changing distance of the aircraft. By contrast, in this invention no error signal is derived, but rather once having acquired the valid distance pulse, the apparatus examines it each succeeding epic to see if it remains within the same range of distance. If, during any epic, the timing of such return pulse does not coincide with the remembered range from the prior epic, the receiver immediately re-searches anew and establishes a new distance range. Thus, instead of locking on or tracking, the system simply re-searches each time the aircraft passes to a different predetermined range, taking advantage of its unique and inherently quick method of logical searching.

SUMMARY OF THE INVENTION

It is the primary object of this invention to provide a digital distance ranging system adapted for aircraft and which derives the aircraft distance to a ground station by logical comparison of received pulses from epic to epic, and which eliminates the need of slow and expensive servo equipment.

It is a further object of this invention to provide a method and means for determining the distance of an aircraft from a ground station by logical analysis of return pulses, and to determine such distance in a vastly reduced amount of time compared to the performance of prior art DME systems.

It is a further object of this invention to provide apparatus for use in the DME receiver of an aircraft which is compatible with the existing mode of DME operation, and which is less expensive and smaller in size than prior art apparatus, which operates more quickly than prior art apparatus, and permits a more accurate resolution of the aircraft range.

In accordance with the above objectives there is provided, as part of the aircraft DME receiver, apparatus comprising a shift register for storing signals corresponding to the ranges of pulses received during the first epic of a distance search, and a comparison circuit for comparing the timing of incoming pulses during each subsequent epic with the signals stored during the preceding epic which are shifted out of the register, gating only pulses representing repeated ranges into the shift register during each such subsequent epic. Logic circuitry analyzes the signals thus stored in the shift register, and when only one signal is stored per epic, such signal is identified and a corresponding distance signal is displayed. Whenever no distance signal is stored in the shift register, reflecting a change of range by a predetermined amount, the above logical procedure is repeated to determine the new range.

DESCRIPTION OF THE PREFERRED EMBODIMENT

Figure 1:
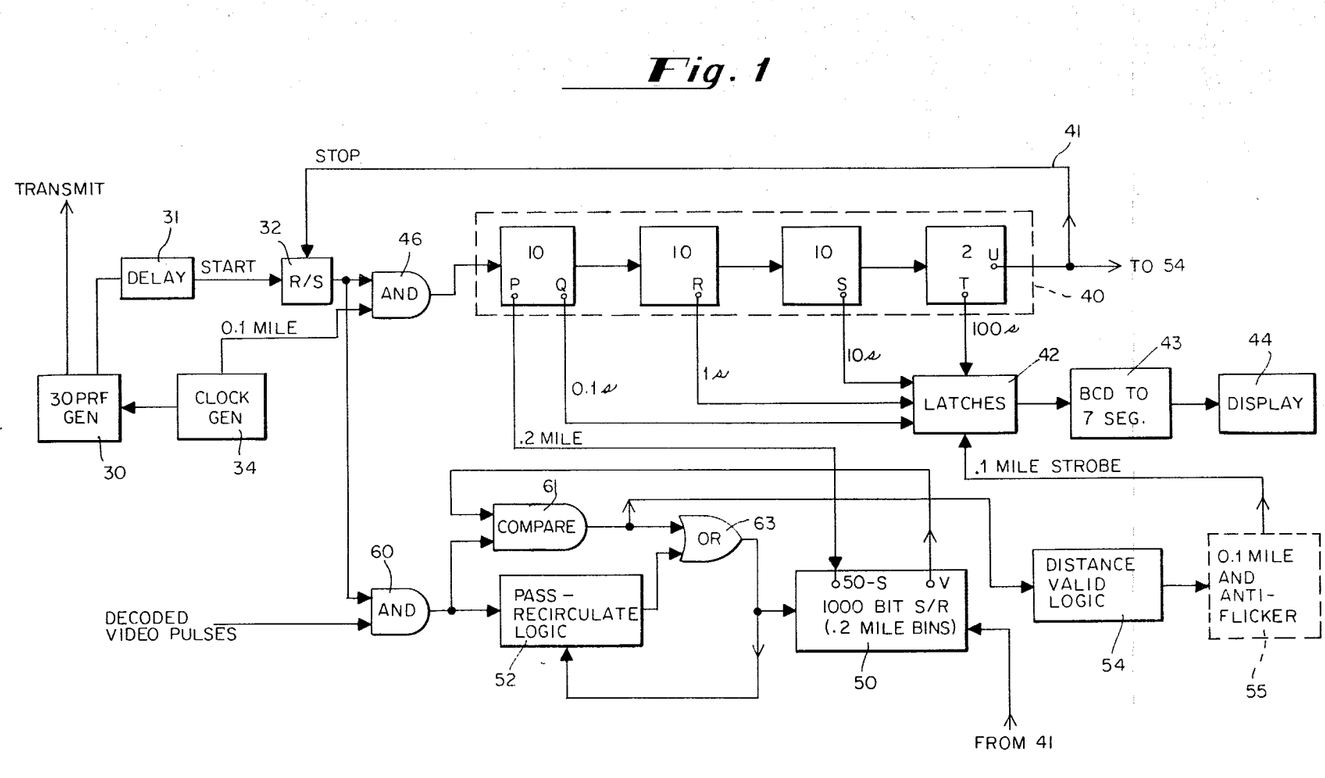
FIG. 1 is a block diagram illustrating the basic components of the apparatus of this system, and the flow of information through the system.

Referring now to FIG. 1, the broad method and functional operation of the apparatus of this invention can be seen. A pulse generator 30, operating at a pulse repetition frequency (PRF) of 30 and providing non-periodic pulses, randomly spaced in time, provides the transmitted pulses which are sent from the aircraft to the ground station. Generator 30 may be any generator as presently used in the DME art, and typically employs a neon bulb as a noise source to provide random triggering of the generated pulses. The output of generator 30 is coupled to a delay circuit 31, which introduces a delay equal to the amount of delay contributed at the DME ground station (48 microseconds) plus approximately 4 microseconds to account for system delay. The output of delay circuit 31 provides a start signal, which is connected to and sets set-reset flip-flop 32. Flip-flop 32 stays set until a stop signal is transmitted on line 41, at a time corresponding to the maximum range of the DME (e.g., 200 miles), at which time the flip-flop 32 is reset. The output of flip-flop 32 thus provides a gating signal during the time period when return pulses may be received corresponding to an aircraft distance in the range of 0 to 200 miles. Such time period is referred to as the search epic, or simply the epic. It is to be understood that the range may be other than 200 miles, which is exemplary of operating DME systems.

The basic timing of the apparatus of this invention is provided by a standard clock generator 34. In the example of this preferred embodiment, the clock generator provides output signals at an interval of approximately 1.1 microseconds, corresponding to a distance from aircraft to ground station of 0.1 mile. The clock signals are preferably coupled to the generator 30 through a synchronizing circuit (not shown) to force the firing of generator 30 to be coincident with a clock signal. This technique, and synchronizing circuitry for so forcing each pulse from a pulse generator to coincide with a clock pulse is well known in the art. Specifically, the TTL dual JK flip-flop, an IC manufactured by Texas Instruments, Motorola, and others is suitable for use in performing this synchronizing step.

The output of clock generator 34 is also coupled to a first input terminal of AND circuit 46. The other input terminal of AND circuit 46 is from the output of flip-flop 32. Thus, during the search period corresponding to a range of 0 to 200 miles, the 0.1 mile clock pulses are passed through AND circuit 46, and are connected to the input of counter 40. In the preferred embodiment, 2,000 such clock pulses correspond to the range of 200 miles.

Counter 40 performs the function of counting time (translatable to distance) throughout each epic. In the preferred embodiment, it is comprised of three binary decimal coded 10 counters in cascade, followed by a 2 counter. The outputs of the 10 counters, designated as Q, R and S respectively, are parallel lines carrying binary coded decimal signals. When 10 clock pulses have been received in the first 10 counter, corresponding to 1 mile, it produces an output pulse which is received in the second 10 counter. When 100 clock pulses have been received, corresponding to a distance of 10 miles, the second 10 counter produces an output pulse which is received in the third 10 counter. When 1,000 clock pulses have been received, corresponding to 100 miles, the third 10 counter produces an output pulse which is received in and sets the 2 counter. When 2,000 pulses have been received, the 2 counter is reset and an output "end of search" pulse is produced at terminal U, which is connected on lead 41 back to the reset terminal of flip-flop 32. Thus, after 2,000 clock pulses, corresponding to 200 miles, the counter is completely cleared and reset, and gate 46 is disenabled, preventing any more inputs to the counter until the next epic.

In the preferred embodiment, each 10 counter is a 7490 IC, and the 2 counter is a 7473 IC. The end-of-search pulse, produced by the 7473 IC, is also connected to the distance valid logic, as described hereinbelow.

The decoded video pulses are provided by conventional circuitry in the receiver, as in prior art DME systems. It is to be understood that such decoded pulses generally include all DME pulses transmitted from the ground station, such that the aircraft's valid return pulse is "hidden" among those of other aircraft in communication with the same ground station. The pulses are coupled to the first input terminal of AND gate 60, and the output of flip-flop 32 is coupled to the second input terminal. Accordingly, during each epic, decoded pulses are gated through AND circuit 60. The output of AND circuit 60 is connected both to pass-recirculate logic 52, and a first input terminal of compare circuit 61. The pass-recirculate logic, as described in more detail hereinbelow, passes the gated decoded pulses during the first epic, or whenever no information is remembered from the prior epic, and blocks passage during all other epics. The output of the pass-recirculate logic is connected to a first input terminal of OR circuit 63, the output of which is connected to the input of a shift register 50, and also back to the pass-recirculate logic. Thus, during the first epic of each search, and only then, logic circuit 52 passes decoded pulses directly to the shift register.

Shift register 50, in the preferred embodiment, is a 1,000 bit shift register comprised of two Synergetics ICs, number 2528. Terminal 50-S of register 50 is connected to the output of the first stage of the first 10 counter of counter 40, at terminal P, from which it receives a 0.2 mile shift signals. Each bit of register 50 represents a 0.2 mile "bin", corresponding to a total range of 200 miles. Each pulse coupled to the input of register 50 loads a signal into the first bin, which is shifted along by the incoming 0.2 mile shift pulses. Thus, after the first epic, the shift register will be loaded with a record of all pulses received throughout the 200 mile range, i.e., a signal will be stored in each bin corresponding to the 0.2 mile range within which a pulse was received.

Referring back to AND circuit 60, it was seen that the output thereof is coupled to a first input terminal of compare circuit 61. The second input terminal is connected to output terminal V of shift register 50. During each epic, as the 0.2 mile shift signals are introduced at terminal 50-S of the register, the signals stored therein during the previous epic are read out at terminal V, and read into compare circuit 61 (a conventional AND gate). It is thus seen that only those pulses which coincide with a 0.2 mile bin signal which had been stored during the previous epic are passed through to the output of circuit 61. The output of circuit 61 is connected to the second input terminal of OR gate 63, as well as to the distance valid logic 54.

The distance valid logic 54 performs the function of counting the number of compared pulses each epic, and determining when one, and only one coincidence pulse is received during an epic. When only one such pulse is received, it necessarily is a valid distance pulse, and is gated through the distance valid logic 54 as a strobe signal which is connected to the latches 42. The latches 42 are conventional solid state latches, preferably in the form of integrated circuits. In the preferred embodiment, the block designated 42 contains four such integrated circuit latches, each one of which has an input connected to a respective one of the individual counters of counter 40. The first 3 latch ICs are 7495s, and are connected respectively to the outputs of the three 10 counters; the fourth IC is a 7474, and is connected to the output (T) of the 2 counter. When the strobe signal is received, the input signals to the latches are held, in effective indefinite memory. The output of the latches, representing a binary coded decimal signal from the counter corresponding to the distance of the received valid distance signal, is converted in block 43 into a seven segment signal applicable to drive a seven segment display device 44 of conventional form.

As an optional feature, the valid distance signal which is passed through logic 54 may be passed through a circuit 55 which performs the function of generating a 0.1 mile strobe signal, i.e., a strobe signal which defines the valid distance pulse as lying within a 0.1 mile range, corresponding to one bit of information contained in the counter 40. Preferably also included in optional circuit 55 is anti-flicker logic, to prevent alternation of the 0.1 mile strobe between adjoining 0.1 mile bins, and to change from one bin to an adjacent bin only after the new bin has been observed for at least three successive epics. It is to be noted that the functions of circuit 55 are described here solely on a functional basis, and the specific apparatus of circuit 55 is not claimed as a part of this invention.

Figure 2:
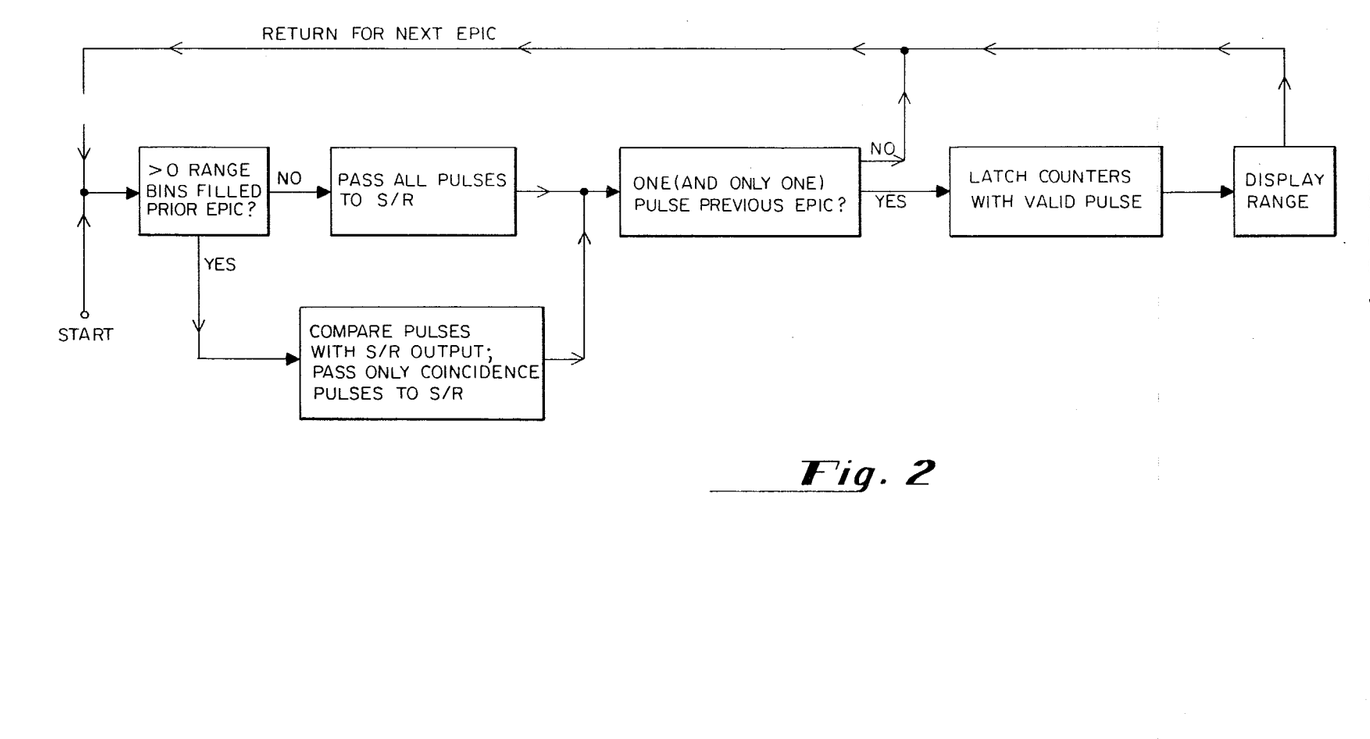
FIG. 2 is a logic diagram illustrating the logic steps of the system of this invention.

Referring now to FIG. 2, there is shown a logic diagram indicating the logical steps taken in performing the method of this invention. At the start of an epic, the system determines whether at least one range bin was filled during the prior epic. If no range bin had been filled, the system is either at initial start up, or the aircraft position had been lost during the prior epic. If the answer is no, the system passes all incoming pulses during the present epic to the shift register. It is also determined whether one, and only one pulse had been received during the previous epic. If this question is answered in the negative (as it will be if no range bins had been filled in the previous epic), no other operation is performed, and the system returns (logically) for the incoming pulses during the next epic. When, during a succeeding epic, it is determined that one or more range bins had been filled during the prior epic, the system proceeds to compare incoming decoded pulses with range signals shifted out of the shift register, passing only coincidence pulses into the shift register, such that at the end of such epic the shift register is loaded with signals corresponding only to pulses (or pulse) within a given range bin that had been repeated for two successive epics. The system then again asks the question whether there has been one, and only one pulse detected during the previous epic. When and if this question is answered yes, the system proceeds to latch the counter when a detected pulse occurs. Such detected pulse is necessarily a valid distance pulse, because it has been found to coincide with a single pulse from the prior epic, all the non-valid pulses having been eliminated in the comparison step. In view of the random timing of the transmitted pulses and the returned pulses, and decoded pulses which are not return pulses from those which the aircraft itself had transmitted are not found in the same range bin during repeated epics. Thus, a pulse received when only one signal had been stored in the shift register during the previous epic is a valid distance pulse. The time of receipt of such pulse corresponds to the count of the counter at the time of receipt, the output of which is latched and converted for distance display.

After a valid pulse has been found, the system then returns to repeat the same logical analysis for the next epic. It is seen that as long as the aircraft is within the same bin, or 0.2 mile range, only one bin will be filled each epic, and the display will continuously indicate such range. As soon as the aircraft moves to an adjacent range, there will be a failure of coincidence of the return pulse with the shift register signal, and no pulse will reach the latch, causing the display to halt. On the next epic, the system finds that no range bins had been filled during the previous epic, and the search procedure is initiated again. In actual practice, it has been found that the logical search procedure of this invention usually produces the valid distance pulse within three epics, such that the display misses only four epics as the aircraft passes from one range to an adjacent range. The time period during which the display is thus de-energized is sufficiently small that as a practical matter it cannot be perceived by the pilot.

Figure 3:
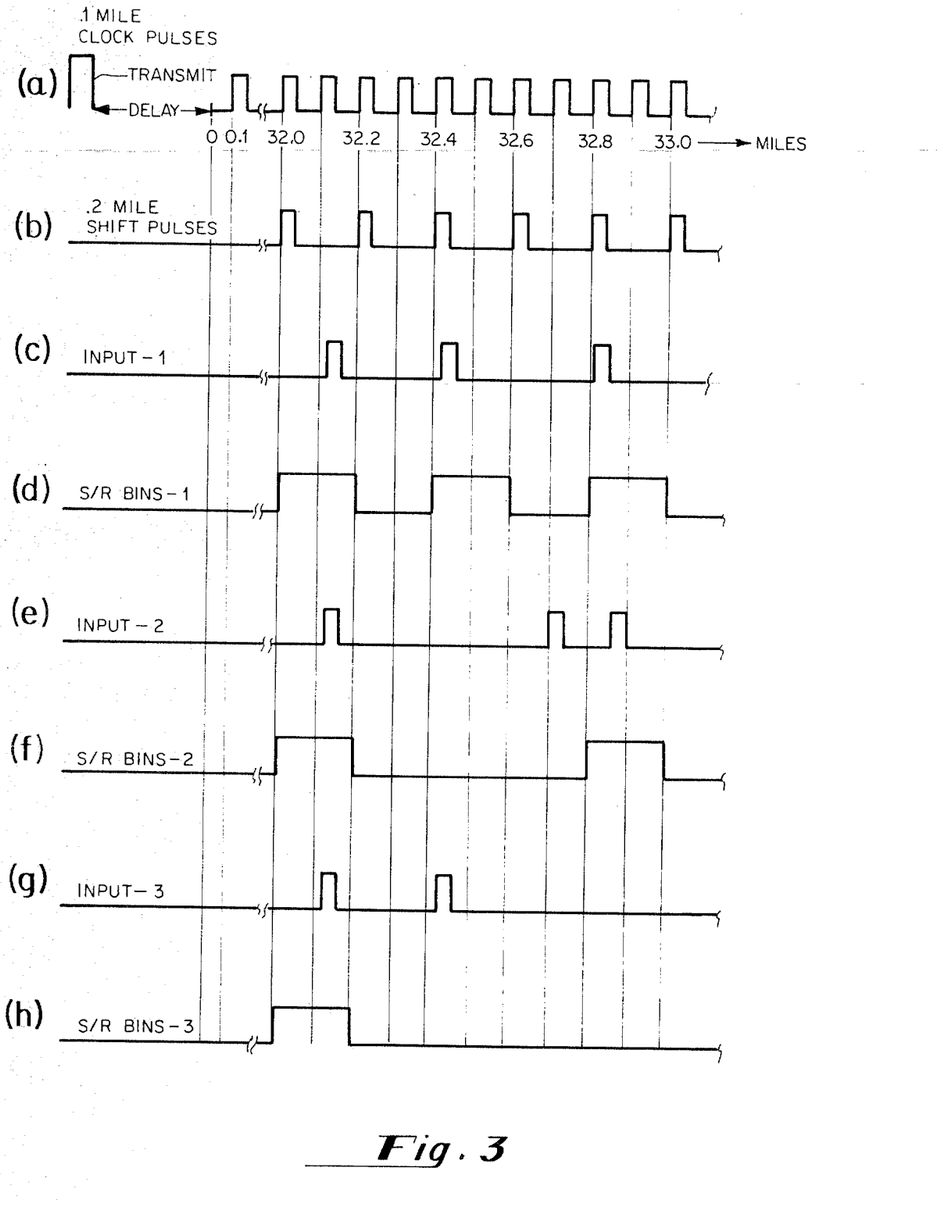
FIG. 3 is a timing diagram illustrating the manner in which signals are generated and processed in the operation of this invention.

Referring now to FIG. 3, there are shown timing diagrams (a)-(h) of pertinent signals generated during a hypothetical three-epic operation of the method and apparatus of this invention. On the top line (a), clock pulses are shown at 0.1 mile intervals, as they are gated through AND circuit 46. Thus, after the delay introduced by delay circuit 31, the first clock pulse corresponds to a distance of 0.1 mile. In this illustration, it is assumed for purposes of simplicity that all incoming pulses lie within a range of 32.0 to 33.0 miles. It is understood that, in a practical situation, this would not be the case, but for purposes of illustration the relevant range has been condensed. At (b) there are illustrated shift pulses, for shifting register 50, which occur at 0.2 mile intervals, or corresponding to every other clock pulse. Line (c) represents hypothetical input pulses during the first epic, and shows pulses occuring within the range bins of 32.0, 32.4, and 32.8 miles. Correspondingly, during the first epic the shift register will have such bins filled, as illustrated in graph (d). Graph (e) illustrates a hypothetical input during the second epic, during which such input pulses are compared with the bin signals of curve (d). The result of such comparison is that after epic 2, the 32.0 and 32.8 mile bins are occupied, as illustrated in curve (f). In curve (g), hypothetical input pulses during a third epic are illustrated, and in comparing these with the signals loaded in the shift register during epic 2, it is seen that only one bin is refilled after epic 3, as shown in graph (h). The presence of one and only one filled bin after the third epic indicates that the true range of the aircraft lies between 32.0 and 32.2 miles.

As stated heretofore, it is desirable to include circuitry so as to latch and display corresponding to a 0.1 mile bin. However, it is to be noted that as a matter of engineering design there is no limit on the number of bins which may be used, and consequently no limit upon the degree of accuracy with which the method and system of this invention may be used. Thus, if a 2,000 bit shift register were used, 0.1 mile bins could be obtained at the shift register. Correspondingly, if desired, the clock generator could be designed to produce clock pulses representing 0.05 miles, and a 4,000 bit shift register could be produced, giving accuracy to within 0.05 miles. While, as a practical matter, such accuracy is not necessary and indeed might not even be useful to a pilot, it is to be understood that the accuracy of the preferred embodiment as illustrated herein is exemplary only.

Figure 4:
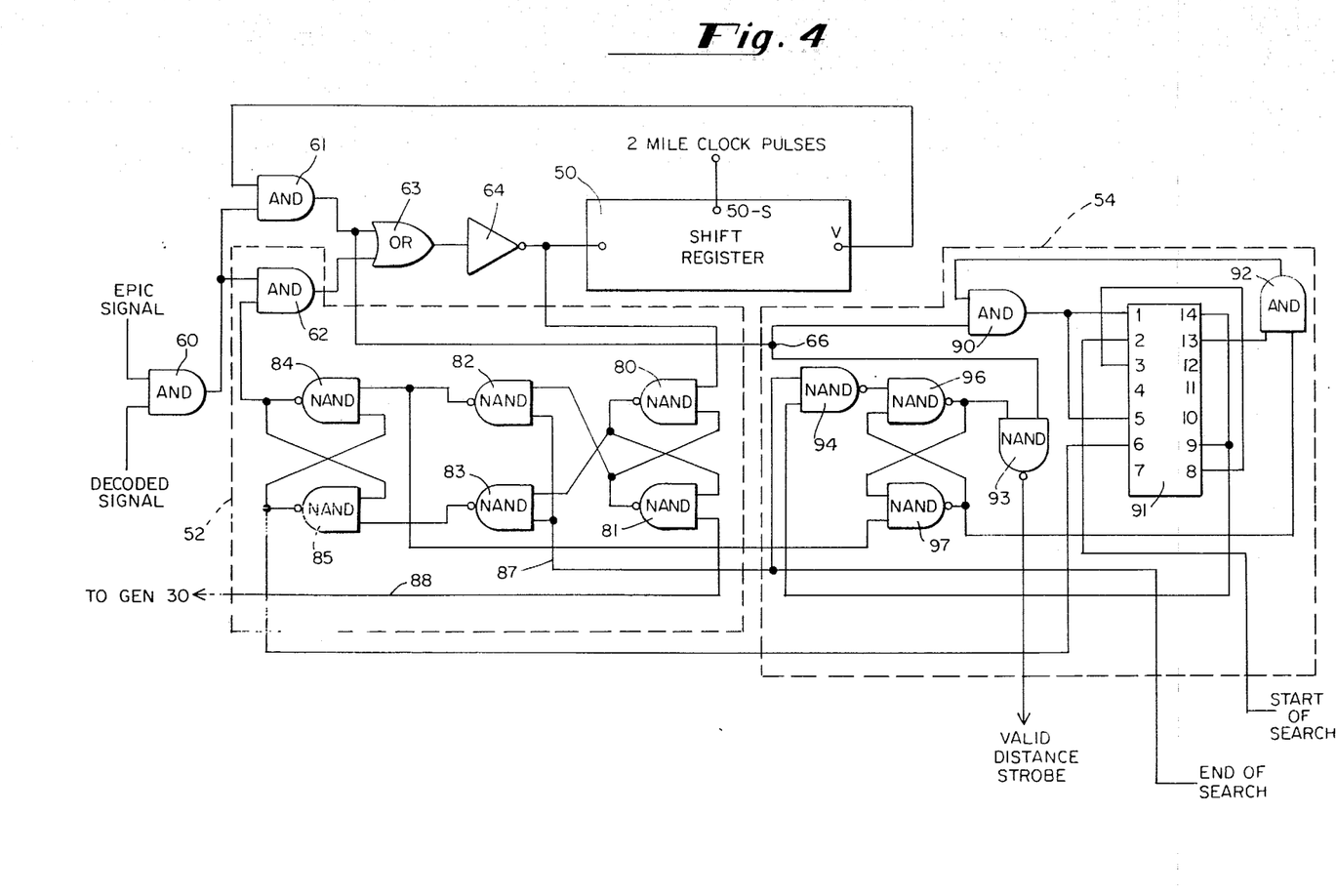
FIG. 4 is a detailed diagram of the "pass-recirculate" and "distance valid" logic circuits as used in the preferred embodiment of this invention.

Referring now to FIG. 4, there is shown a more detailed diagram of the pass-recirculate logic 52 and the distance valid logic 54, in combination with the shift register 50. Comparison gate 61 is shown, the output of which is coupled to one of the input terminals of OR gate 63. The output of gate 63 is also coupled through an inverter 64 into the input of the shift register 50. The other input to OR gate 63 is derived from the output of an AND circuit 62 within logic box 52. One input to AND gate 62 comes from the output of gate 60, and carries decoded video pulses. The other input to gate 62 enables passage of the decoded pulses when no coincidence pulses were detected during the prior epic, and blocks passage when coincidence pulses had been detected during the previous epic. Thus, AND gate 62 performs the final functional operation of logic block 52, permitting all of the incoming decoded pulses to be passed through to the shift register only during the first epic of a search.

The output of inverter 64, representing the input signals to the shift register, is connected to a first input terminal of a NAND gate 80. This gate, like other NAND gates referred to herein, produces a high output when a low signal is coupled to either input terminal, and a low output when a high signal is coupled to each input terminal. NAND gate 80 is connected with NAND gate 81 so as to form a flip-flop, and one input terminal of 81 is connected by line 88 to generator 30. The output of NAND 80 is connected to a first input of NAND 83, and the output of NAND 81 is connected to a first input terminal of NAND 82. The respective other input terminals of NANDS 82 and 83 are connected to counter 40 by line 87 which carries the end-of-search signal, indicating that for the present epic, the 200 mile time had arrived. The output of NAND gate 82 is connected to a first input terminal of NAND gate 84, and the output of NAND gate 83 is connected to a first input terminal of NAND gate 85. NANDs 84 and 85 are connected as a flip-flop, in the same manner as NANDs 80 and 81. The output of NAND 84 is connected to the second input terminal of AND gate 62.

In operation, the NAND pair 80, 81 is reset by a signal from generator 30 at the start of an epic, such that the output of 80 is low and the output of 81 is high. If no pulse is received from inverter 64 during the epic, the upper input terminal of 82 is held high. The lower input terminal of 82 is normally low, but goes high at the end of the search (at 200 miles), so that both inputs to 82 are high, and the output is low. This low output is coupled to a first of the input terminals of 84, causing the output of 84 to be high, which is its normal condition which is held until a subsequent epic when at least one pulse is detected. It is noted that the output of NAND 85 is low, and consequently 84 can not produce a low output until flip-flop 84-85 changes its state due to a high signal passed through 83.

If a single pulse, or more than one pulse passes through inverter 64 to the shift register 50, such pulse is connected to the upper input terminal of NAND 80, causing the flip-flop 80-81 to change state, such that the output of 81 goes low and that of 80 goes high. When this happens, no change results at the output of 84, because NANDs 82 and 83 prevent any change until the end of search signal. However, upon the arrival of the end of search signal, presenting high inputs on respective input terminals of 82 and 83, the output of 83 goes low, causing the output of 85 to go high. At the same time, the output of 82 goes high, enabling 84 and causing its output to go low, with flip-flop 84-85 now in a changed state. Consequently, AND circuit 64 receives a low signal at one of its input terminals, preventing input pulses from passing directly therethrough, and on to the shift register. During succeeding epics there is no change in the output of NAND 84 until there is an epic wherein no pulses are passed into the shift register. Until such time, the output of 84 remains low, blocking direct transmission of signals through AND 62, such that only detected pulses which compare with the output of the shift register and thus pass through gate 61 are coupled into the shift register. Only during the next subsequent epic when no signal passes through to the shift register does a low signal pass through NAND 82 at the end of search, thus resetting flip-flop 84, 85 to produce a high output from NAND 84.

Referring now to the distance valid logic block 54, the input to this logic circuitry is derived from the output of comparison gate 61. As stated before, this logic circuitry surveys each epic, and when and only when there is just one coincidence pulse during an epic, logic circuitry 54 remembers this condition, and during the next epic gates through such one coincidence pulse as a valid distance strobe, i.e., a pulse which represents a return of a transmitted pulse from the plane and thus represents the plane's position. Following any epic when zero or more than one coincidence pulse comes through, logic circuitry 54 does not permit an output signal which passes through to the latches 42.

The output from gate 61 is connected to node 66, which in turn is connected to a first input terminal of AND gate 90, and to a first input terminal of a NAND gate 93. Under normal conditions, the signal on the other input terminal of gate 90 (the origin of which is explained hereinbelow) is high, so that any pulse received at node 66 is passed through to the output of gate 90. The output of 90 in turn is connected to terminals 1 and 5 of dual J-K flip-flop 91. Dual J-K flip-flop 91 is preferably an IC such as manufactured by Texas Instruments, Motorola and others, number 7473. Terminals 1 and 5 of 91 are connected to the output of gate 90, and are clock input terminals, such that inputs received at such terminals advance the dual flip-flop. Pin 13 is high in its initial state but is changed to a low state when and only when two input clock pulses have been received. Terminals 8 and 9 are initially low, but are changed in state (from low to high, high to low) with each incoming clock pulse.

Pin 13 is connected to the first input terminal of an AND gate 92, and a second input terminal of gate 92 is connected to the output of a flip-flop comprised of a pair of NANDs 96 and 97. The output of AND 92 is connected to one of the two input terminals of AND gate 90. Terminal 9 of 91 is connected to a first input terminal of NAND 94, which has a second input terminal connected to counter 40 to receive the end of search signal. The output of NAND 94 is connected to one of the input terminals of NAND 96. NANDs 96 and 97 are connected, as shown, in the form of a flip-flop. The reset terminal of NAND 97 is connected to the output of NAND 83 (within logic circuitry 52). Terminal 2 of 91 is connected to receive a start of search signal, by which 91 is reset for each epic.

In operation, if only one clock pulse is received at 91 during an epic, pin 13 remains high, enabling gate 92. However, if a second pulse is received, pin 13 changes state and goes low, thus inhibiting gate 92. Under these circumstances no more signals can be received at pins 1 and 5, and so pin 9 is locked low. If there is one incoming pulse, pin 9 is in a high state, and the first input terminal of 94 is high. The other input terminal goes high at the end of the search, producing a low signal into 96. This low signal sets flip-flop 96–97 and causes a high at the output of 96, which is connected to one of the input terminals of AND gate 93. Thus, 93 is enabled, and remains enabled through the next succeeding epic, such that any coincidence pulse received during the next epic is passed through gate 93, as a valid distance strobe. However, if more than one input signal is received at IC 91, upon the second signal being received, terminal 13 goes negative, inhibiting gate 92, which in turn inhibits gate 90. Thus, no more than two pulses get through to circuit 91, under which condition terminal 9 is held in a low state for the remainder of the epic. Under these circumstances, the output of NAND 94, at the end of the epic, is caused to be high, causing the output of NAND 96 to go low, thereby inhibiting gate 93 and preventing the passage of any distance strobe signal during the next epic. It is thus seen that logic circuitry 54 performs the function of determining when one, and only one coincidence pulse is received during an epic, and then permitting passage of a coincidence pulse during the next epic through to the latch, so as to permit display of the aircraft range.

While the preferred embodiment of apparatus suitable for carrying out the method of the invention has been described above, it is to be understood that a number of different, but functionally equivalent apparatus components may be utilized within the spirit and scope of the invention. For example, other specific forms of logic circuitry may be readily devised for performing the logical operations indicated in FIG. 2. Further, other memory forms may be utilized for remembering, from epic to epic, the history of prior received pulses, in order to carry out the logical determination of which one, among the many pulses received at the aircraft during each epic, represents a repeat of a return pulse within the same range bin, and thus represents a valid return pulse.

I claim:

1. Digital apparatus for use in determining distance of a plane from a ground station, said plane being equipped with a transmitter suitable for transmitting DME signals to a ground receiving station, and for receiving and decoding DME signals returned from said ground station, said apparatus comprising:
   a. timing means, for timing each search epic;
   b. storage means operatively connected to said timing means, for storing signals representative of the range of such received and decoded signals;
   c. comparison means, for comparing signals received during a given epic with said representative range signals stored during the prior epic to determine those which have a range coincident with that of one of such prior epic signals, and for coupling to said storage means signals representing such coincidence ranges;
   d. pass-recirculate means, for passing decoded signals directly to said storage means during any epic after an epic when no signals were stored in said storage means, and for allowing only said coincidence signals to be stored in said storage means during epics following an epic where at least one signal is stored in said storage means;
   e. valid distance means for determining when only one such coincidence signal is stored per epic; and
   f. means for displaying the distance corresponding to said one coincidence signal, such distance representing the distance of the plane from the ground station.

2. The apparatus as described in claim 1, wherein said timing means comprises a clock generator and a counter which counts the clock pulses produced by said generator each epic.

3. The apparatus as described in claim 2, comprising epic gate means for gating clock pulses to said counter only during each search epic.

4. The apparatus as described in claim 3 wherein said counter provides a binary coded decimal output, and produces an end of search signal which signals the end of each search after the counter has received a predetermined number of clock pulses.

5. The apparatus as described in claim 1 wherein said storage means is a shift register, and said shift register is connected to said counter to receive shift signals which shift all signals stored therein during a given epic out of the register during the next succeeding epic.

6. The apparatus as described in claim 2 wherein said valid distance means performs the function of enabling the display means during the next epic following the determination of said only one coincidence signal, passing a valid distance pulse which is coincident with said one coincidence signal.

7. The apparatus as described in claim 6 wherein said display means comprises latches which are connected to said valid distance means and which receive inputs from said counter, and which hold the count of said counter at the time of said valid distance pulse.

8. In a DME aircraft receiver, a method of separating return DME signals of such aircraft from other signals, and of determining the distance of such aircraft from the ground station from which such signals are returned, comprising:
   a. during a first epic, storing all received signals in time relationship relative to the time of transmittal of the DME signal from the aircraft;
   b. in each successive epic after at least one signal has been stored, storing in time relationship only received signals in time coincidence with signals stored during the prior epic; and,
   c. identifying when only one such coincidence signal is stored during an epic, and deriving the aircraft distance from the time of such one stored signal.

9. Digital apparatus for determining the distance of a plane from a ground station, said plane being equipped with a transmitter suitable for transmitting DME signals to a ground receiving station, and for receiving and decoding DME signals returned from said ground station, said apparatus comprising:
   a. memory means adapted to store signal representations of the time relationship of such signals received during an epic;
   b. first logic means for gating into said memory means all of the received signals during the search epic following a prior epic when no signals are stored in said memory means;
   c. second logic means, operative during each successive epic after the first epic when at least one signal is stored in said memory means, to gate into said memory means only signals in relative time coincidence with the signal representations stored in the prior epic; and
   d. third logic means, for identifying when only one signal representation is stored in said memory means during an epic, and for deriving the distance of the plane from the time of occurrence during the succeeding epic of a signal in time coincidence with such one signal representation.

10. The method as described in claim 9, further comprising the steps of determining when no signals are stored during a search epic, and repeating the steps as set forth in claim 9 and in the sequence as there set forth.

11. In an aircraft equipped to transmit DME signals to a ground station and operate on signals returned therefrom, the method of determining the distance of such aircraft from such ground station, comprising:
   a. decoding signals received from said ground station to obtain video pulses;
   b. gating said pulses during search epics following each transmitted DME signal;
   c. during a search epic when no history of prior distance signals is available in the receiver, storing signal representations of all said gated signals in relative time relationship;
   d. in the next epic after an epic during which at least one signal representation has been stored, reading signal representations stored from the prior epic in time reference to the transmitted signal of said next epic, and comparing said read signal representations with said gated signals, and storing only those gated signals in time coincidence with one of said read signals;
   e. repeating the steps of reading, comparing and storing until only one such time coincidence is stored during an epic, and deriving the distance of the plane to the ground station from the time of such one coincidence.

12. The method as described in claim 11, wherein during said first search epic said gated pulses are stored in a shift register, and during successive epics, said stored representations are read out and connected to a first input terminal of a coincidence circuit, and said gated pulses are connected to a second input terminal of such coincidence circuit, such coincidence circuit passing a gated pulse only when it coincides in time relationship with a corresponding gated pulse during the prior search epic.

13. Digital apparatus for use in determining the distance of an object from a remote station, said object being equipped to transmit pulse signals to said remote station and receive and decode said signals when returned from said remote station, said apparatus comprising:
   a. memory means for storing signals representing ranges of pulses received during an epic;
   b. comparison means for comparing the ranges of decoded pulses received during an epic with the range representations stored from the prior epic;
   c. logic means for limiting the range signals stored in said memory means each epic to those representing the ranges of pulses received during such epic which coincide with a range stored during the prior epic;
   d. means for determining when only one range signal is stored during an epic; and
   e. means for displaying an output corresponding to such one range.

14. Digital apparatus for use in determining the distance of an object from a remote station, said object being equipped to transmit pulse signals to said remote station and receive and decode said signals when returned from said remote station, said apparatus comprising:
   a. memory means for storing signals representing ranges corresponding to received pulses;
   b. signal control means operative during successive search epics for limiting, during said each such successive epic, the input to said memory means to signals each of which represents a range corresponding to a pulse received both during the prior epic and during the next following epic;
c. logic means for determining when only one range signal is stored during one of said next following epics; and
d. means for displaying an output corresponding to said only one range signal.

15. The apparatus as described in claim 14 wherein said memory means comprises a shift register in combination with a shift signal generator, said range signals being stored in bins of said counter and being shifted through said counter by signals from said shift generator.

16. The apparatus as described in claim 15 wherein said signal control means performs the following functions:
a. when no range signals have bee stored in said memory means during a prior epic, pass all received pulses during the next epic into said memory means for storage; and
b. when one or more range signals have been stored in said memroy means during a prior epic, the pulses received during the next epic are compared with the range signals stored in said memory means during said prior epic, and only pulses having a range coincident with that of one of the stored signals are passed into said memory means for storage.

17. A method for determining the distance of an object from a remote station, said object being equipped to transmit pulse signals to said remote station and receive and decode signals returned from said remote station, comprising:
a. during a first epic, storing signals in a memory, which signals are representative of the ranges corresponding to the time of receipt of decoded signals relative to the start of said first epic;
b. during the next epic, reading out said stored range signals in a time relationship referenced to the start of said succeeding epic;
c. comparing the time of said read-out signals and the signals received during said succeeding epic, and storing only signals representative of such received signals which are time coincident with a read-out signal;
d. repeating during following epics the steps of reading out, comparing, and storing coincidence signals, until only one such coincidence signal is stored during an epic; and
e. displaying a range signal corresponding to said one coincidence signal.

* * * * *

UNITED STATES PATENT OFFICE
CERTIFICATE OF CORRECTION

Patent No. 3,781,888  Dated December 25, 1973

Inventor(s) John W. Bail

It is certified that error appears in the above-identified patent and that said Letters Patent are hereby corrected as shown below:

Column 8, line 55, delete --64-- and insert therefor --62--.
Column 9, line 48, delete --83-- and insert therefor --82--.
Column 11, Claim 10, lines 1 and 4, delete --9-- and
    insert therefore --8--.

Signed and sealed this 9th day of July 1974.

(SEAL)
Attest:

McCOY M. GIBSON, JR.
Attesting Officer

C. MARSHALL DANN
Commissioner of Patents